United States Patent
Eigler et al.

(10) Patent No.: US 8,667,298 B2
(45) Date of Patent: Mar. 4, 2014

(54) MODULE SIGNING FOR UNPRIVILEGED USERS TO CREATE AND LOAD TRUSTWORTHY KERNEL MODULES

(75) Inventors: Frank Ch. Eigler, Brantford (CA); Dave Brolley, Toronto (CA)

(73) Assignee: Red Hat, Inc., Raleigh, NC (US)

( * ) Notice: Subject to any disclaimer, the term of this patent is extended or adjusted under 35 U.S.C. 154(b) by 758 days.

(21) Appl. No.: 12/721,428

(22) Filed: Mar. 10, 2010

(65) Prior Publication Data

US 2011/0225420 A1 Sep. 15, 2011

(51) Int. Cl.
*G06F 21/00* (2013.01)

(52) U.S. Cl.
USPC ........... 713/187; 713/176; 713/188; 713/189; 713/190

(58) Field of Classification Search
USPC ........................... 713/176, 187–190; 717/127
See application file for complete search history.

(56) References Cited

U.S. PATENT DOCUMENTS

2006/0122937 A1* 6/2006 Gatto et al. ..................... 705/51
2010/0192207 A1* 7/2010 Raleigh ............................ 726/6

* cited by examiner

*Primary Examiner* — Justin T Darrow
(74) *Attorney, Agent, or Firm* — Lowenstein Sandler LLP

(57) ABSTRACT

A module building system, hosted by a server, receives a user script to be run to monitor software on a client using an introspection tool. The server adds safety constraints to the user script and generates a client kernel module using the user script which includes the safety constraints. The server signs the client kernel module and sends the signed client kernel module to the client. The signed client kernel module allows a user to use the introspection tool to load and execute the client module on the client for monitoring the software on the client.

20 Claims, 6 Drawing Sheets

MODULE SIGNING FOR UNPRIVILEGED USERS TO CREATE AND LOAD TRUSTWORTHY KERNEL MODULES

TECHNICAL FIELD

Embodiments of the present invention relate to generating introspection kernel modules. Specifically, the embodiments of the present invention relate to generating and signing a kernel module for an unprivileged user.

BACKGROUND

An introspection tool, such as the SystemTap introspection tool for the Linux® operating system, allows users, such as system administrators and software developers, to examine the activities of software (e.g., operating system, applications, programs) while the software is executing to help diagnose a performance or functional problem. An introspection tool can include tracing and probing features, for example, to allow a user to examine variables in the software code, and to 'hook' into the software code to gather information about the software. A user can use an introspection tool to create a user introspection script containing functions to examine and monitor software. The introspection tool translates and compiles the user script to create binary code (kernel module) that runs within the kernel, and loads and runs the kernel module to examine the software.

Traditionally, user introspection scripts have provided full system-wide instrumentation to system administrators, including visibility and manipulation capabilities into a kernel or arbitrary user processes. Unlimited full system-wide instrumentation, however, may be unsuitable for ordinary unprivileged users, such as software developers and performance analysis staff. Currently, an unprivileged user may have access to probe processes of other users and access to probe the kernel itself. There is not a mechanism to limit an unprivileged user to a safe subset of introspection tool functionality.

Limiting user access to this safe subset of functionality can be challenging, since an introspection tool involves the creation, loading, and execution of kernel modules, with complete theoretical control over the hardware. There are at least two problems. First, when generating the kernel module, safety constraints must be enforced during the translation and compilation of the user script. One solution may be that during the translation and compilation processes an introspection tool can check for the presence of any probe types or function calls that are not known to be safe for unprivileged users, and can immediately reject scripts that attempt to use them. An unprivileged user, however, could easily interfere with the translation and compilation processes to weaken the checks which may cause the safety promises to not hold. For example, an unprivileged may change temporary files, modify the running translation and compilation processes, and disable the checks. The second problem is that the system which is supposed to load and run the kernel module must ascertain that the appropriate safety constraints were in fact included in the kernel module. Even if a kernel module was translated and compiled properly, the kernel module might have been corrupted by the time it is presented to the system that is supposed to load and run the kernel module.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for generating a safe client kernel module using a trusted compilation server. A module building system, hosted by a server, receives a user script intended to monitor software on a client using an introspection tool. The server adds safety constraints to the user script and generates a client kernel module using the user script which includes the safety constraints. The server signs the client kernel module and sends the signed client kernel module to the client. The signed client kernel module allows a user to use the introspection tool to load and execute the client module on the client for monitoring the software on the client.

Full system-wide introspection instrumentation may be unsuitable for ordinary unprivileged users, such as software developers or performance analysis staff. Embodiments of the present invention use a trusted compilation server to translate and compile user scripts from an unprivileged user to generate a safe client kernel module that limits an unprivileged user to a safe subset of introspection tool functionality. Use of a trusted compilation server isolates an unprivileged user from the module generation processes and provides a system administrator a means to formally approve certain selected trustworthy installations for generating and signing kernel modules.

Figure 1:
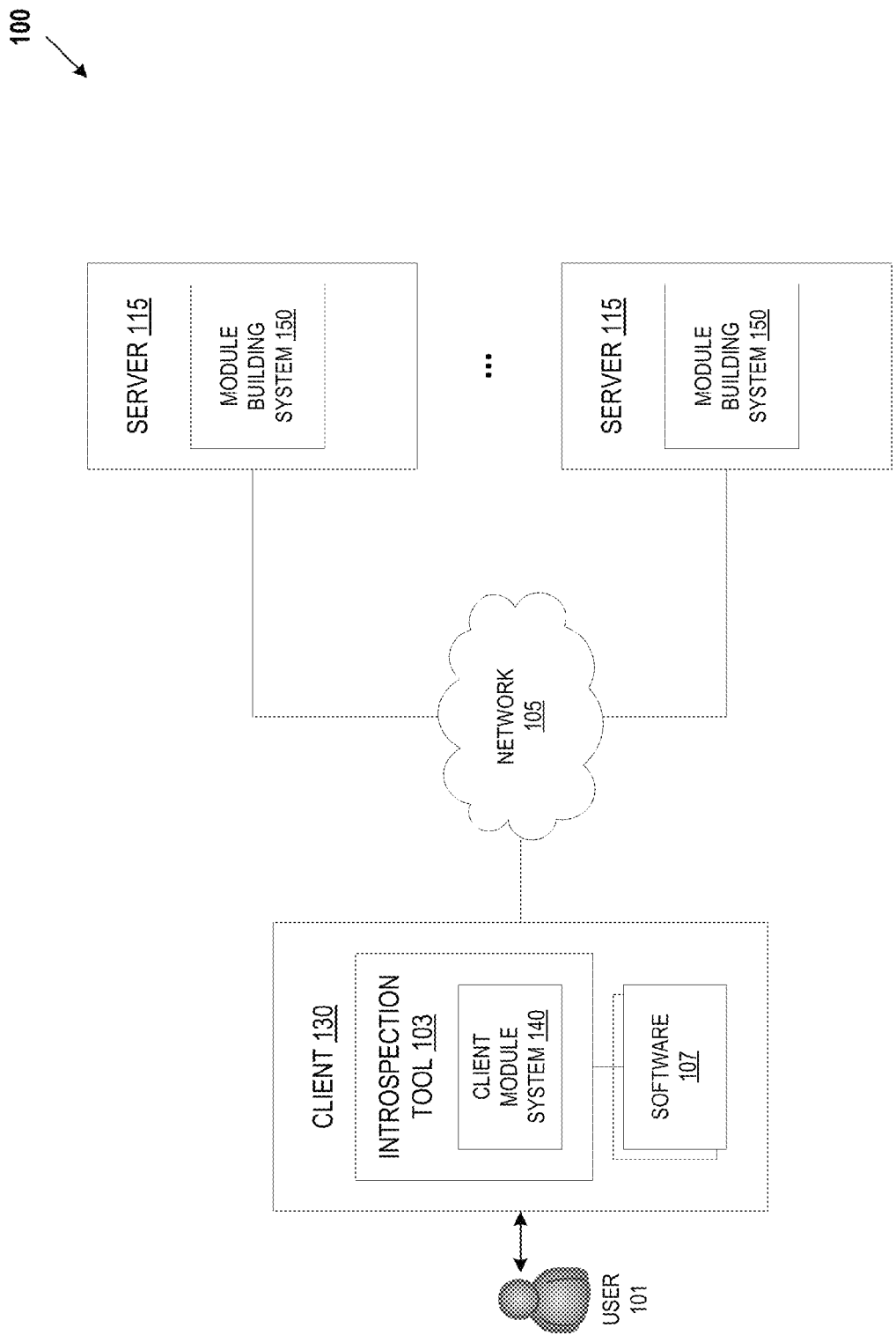
FIG. 1 illustrates an exemplary network architecture in which embodiments of the present invention may operate.

FIG. 1 illustrates an exemplary network architecture 100 in which embodiments of the present invention may operate. The architecture 100 includes a client computing system 130 coupled to one or more compilation servers 115 via a network 105. The client 130 hosts an introspection tool 103 to allow a user 101 to examine and monitor the activities of software 107 that is executing (e.g., operating system, applications, programs), to help diagnose a performance or functional problem. A client computing system 130 may be a personal computer, a laptop, a PDA, a mobile phone, etc.

A compilation server 115 hosts a module building system 150 for generating a safe client kernel module in a trusted compilation environment to allow a user 101 (e.g., an unprivileged user) use of a safe subset of introspection tool 103 functionality. A compilation server 115 may be a server computer, gateway computer, etc. In another embodiment, the module building system 150 may be hosted on same computer system which hosts the introspection tool 103 and a client module system 140. The network 105 may be a public network (e.g., Internet) or a private network (e.g., a local area network (LAN). An exemplary computer system for a client module system 140 or a module building system 150 is described in greater detail below in conjunction with FIG. 6.

A user 101 can use an introspection tool 103 to load and execute kernel modules for examining and monitoring the activities of software 107. An example of an introspection tool 103 for the Linux® operating system is the SystemTap introspection tool. A user 101 can be a privileged user or an unprivileged user. Privileged users are users that may load and execute any kernel module. An example of a privileged user is a root user. A user can also be designated a privileged user by belonging to a group for privileged users, such as a 'stapdev' group in the SystemTap introspection tool. Unprivileged users are users that do not have privileges to load and execute any kernel module. Unprivileged users can have privileges which are limited to loading only kernel modules that are signed by a trusted compilation server, such as compilation server 115. Examples of unprivileged users include software developers and performance analysis staff. A user can be designated as an unprivileged user by belonging to a group of unprivileged users, such as a 'stapusr' group in the SystemTap introspection tool. A user that is not a root user, a member of a privileged user group, or a member of an unprivileged user group cannot load a kernel module at all.

The client 130 hosts a client module system 140 to allow an unprivileged user 101 use of a safe subset of introspection tool functionality. An unprivileged user 101 can use the introspection tool 103 to create a user script containing functions to examine and monitor software 107 that is running on the client 130. Rather than having the introspection tool 103 on the client 130 to translate and compile the user script to generate a kernel module for monitoring the software 107, the client module system 140 can package the user script and send the packaged user script to a trusted compilation server 115. Use of a trusted compilation server 115 helps to prevent any tampering with the module generation processes.

A trusted compilation server 115 is a server for validating the packaged user script and for generating a safe client kernel module in a trusted compilation environment using a validated user script. A server can be designated a trusted compilation server 115 by a system administrator. A trusted compilation server 115 can receive a packaged user script from a client 130 over the network 105, add safety constraints to the user script, and compile the user script that includes the safety constraints to generate a client kernel module. The trusted compilation server 115 can sign the client kernel module using a digital certificate and send the signed client kernel module to the client 130. The client module system 140 can receive the signed client kernel module, verify its signature, and allow an unprivileged user 101 to load and execute a client kernel module, which has a valid signature, on the client 130.

Figure 2:
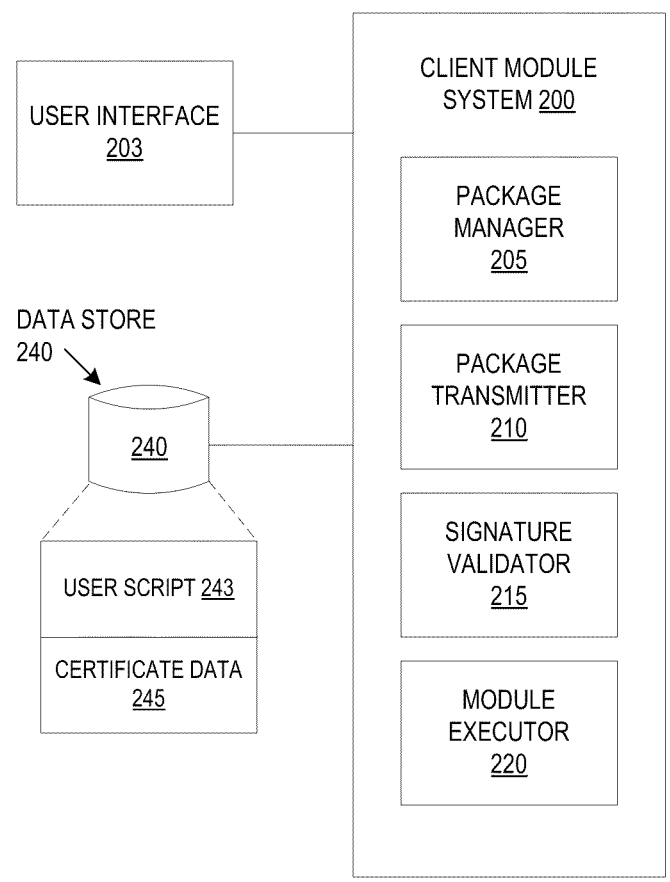
FIG. 2 is a block diagram of one embodiment a client module system.

FIG. 2 is a block diagram of one embodiment a client module system 200. The client module system 200 may be the same as client module system 140 in client 130 of FIG. 1. The client module system 200 includes a package manager 205, a package transmitter 210, a signature validator 215, and a module executor 220. This division of functionality is presented by way example for sake of clarity. One skilled in the art would understand that the functionality described could be combined into a monolithic component or sub-divided into any combination of components.

An introspection tool assists users, such as privileged and unprivileged users, in writing custom user scripts using a scripting language to analyze software. The client system module 200 can be coupled to a data store 240 that stores user scripts 243. A user script 243 may be an existing script selected by a user from the scripts 243 stored in the data store 240, or any script submitted by a user. For example, the user script 243 may be a user introspection script written by an unprivileged user or a user introspection script selected by an unprivileged user. The data store 240 can be a persistent storage unit. A persistent storage unit can be a local storage unit or a remote storage unit. Persistent storage units can be a magnetic storage unit, optical storage unit, solid state storage unit or similar storage unit. Persistent storage units can be a monolithic device or a distributed set of devices. A 'set', as used herein, refers to any positive whole number of items.

The package manager 205 can obtain a user script 243 and package the user script 243. The packaged script can contain the user introspection script and additional information for compiling the user script. The packaged script can also contain an option to control whether a trusted compilation server compiles the script for an unprivileged user or for a privileged user. The package manager 205 can receive the user script or the selection of a user script from the data store 240 via a user interface 203. The user interface 203 may be a graphical user interface. An example of a package manager 205 is the 'stap' program for the SystemTap introspection tool.

The package transmitter 210 can identify a trusted compilation server to which the script package should be sent. The package transmitter 210 can automatically detect which trusted compilation server to send the packaged script to or a user (e.g., an unprivileged user) can specify a trusted compilation server to send the packaged script to. A trusted compilation server can advertise itself on the network. For example, a trusted compilation server can utilize a 'avahi' daemon to advertise itself. One skilled in the art, however, would understand that other methods could be used. A trusted compilation server can provide information about its capabilities. For example, the trusted compilation server might advertise which version of the operating system it can create modules for, for which hardware architecture, etc. A client can select a trusted compilation server whose capabilities match the operating environment of the client host. If more than one trusted compilation server is advertised, a client can attempt to connect to each one in turn in an unspecified order until successful. The package transmitter 210 can send the script package to the identified trusted compilation server.

The trusted compilation server can generate and sign a safe client kernel module, and send the signed client kernel module to the client. The client module system 200 can include a signature validator 215 to receive the signed client kernel module from the server and to verify the signature in the client kernel module. The signature validator 215 can be coupled to a data store 240 that stores certificate data 245 for certificates corresponding to trusted compilation servers. The certificate data 245 can include a public key for each certificate. The signature validator 215 can use the public key to verify whether or not a client kernel module was signed by a trusted compilation server.

The module executor 220 can load and run a client kernel module that has a valid signature and can prevent an unprivileged user from loading and running a client kernel module that does not have a valid signature. The module executor 220 can notify a user (e.g., an unprivileged user) that a client kernel module is rejected for not having a valid signature. For example, the module executor 200 can generate a diagnostic message. An example of a module executor 220 is a 'staprun' program for the SystemTap introspection tool.

The client module system 200 can be implemented as hardware, computer-implemented software, firmware or a combination thereof. In one embodiment, the client module system 200 comprises instructions stored in memory 604 that cause a processing device 602 in FIG. 6 described in greater detail below to perform the functions of the client module system 200.

Figure 3:
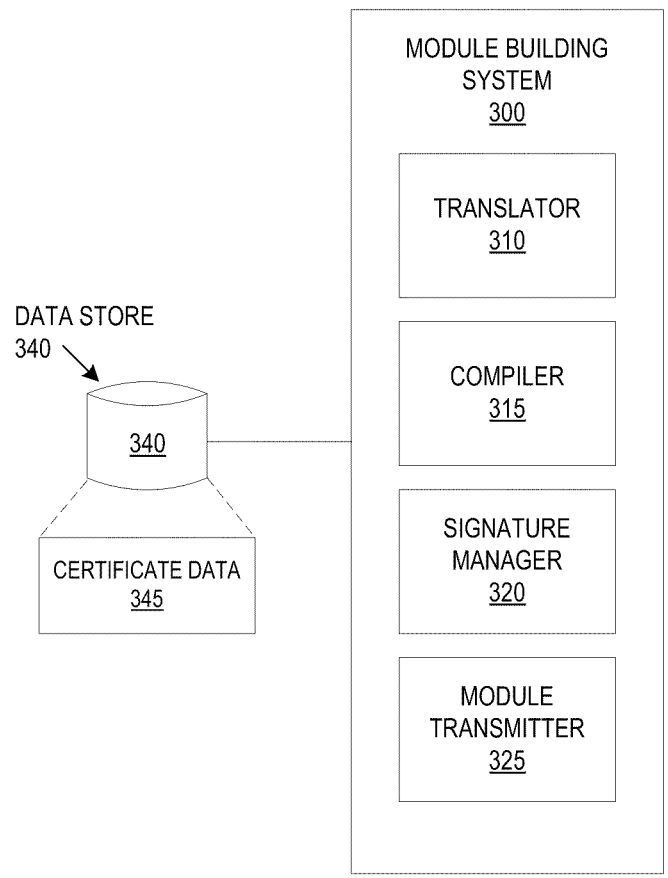
FIG. 3 is a block diagram of one embodiment a module building system.

FIG. 3 is a block diagram of one embodiment of a module building system. The module building system 300 may be the same as module building system 150 in server 115 of FIG. 1. The module building system 200 includes a translator 310, a compiler 315, a signature manager 320, and a module transmitter 325. This division of functionality is presented by way example for sake of clarity. One skilled in the art would understand that the functionality described could be combined into a monolithic component or sub-divided into any combination of components.

Figure 5:
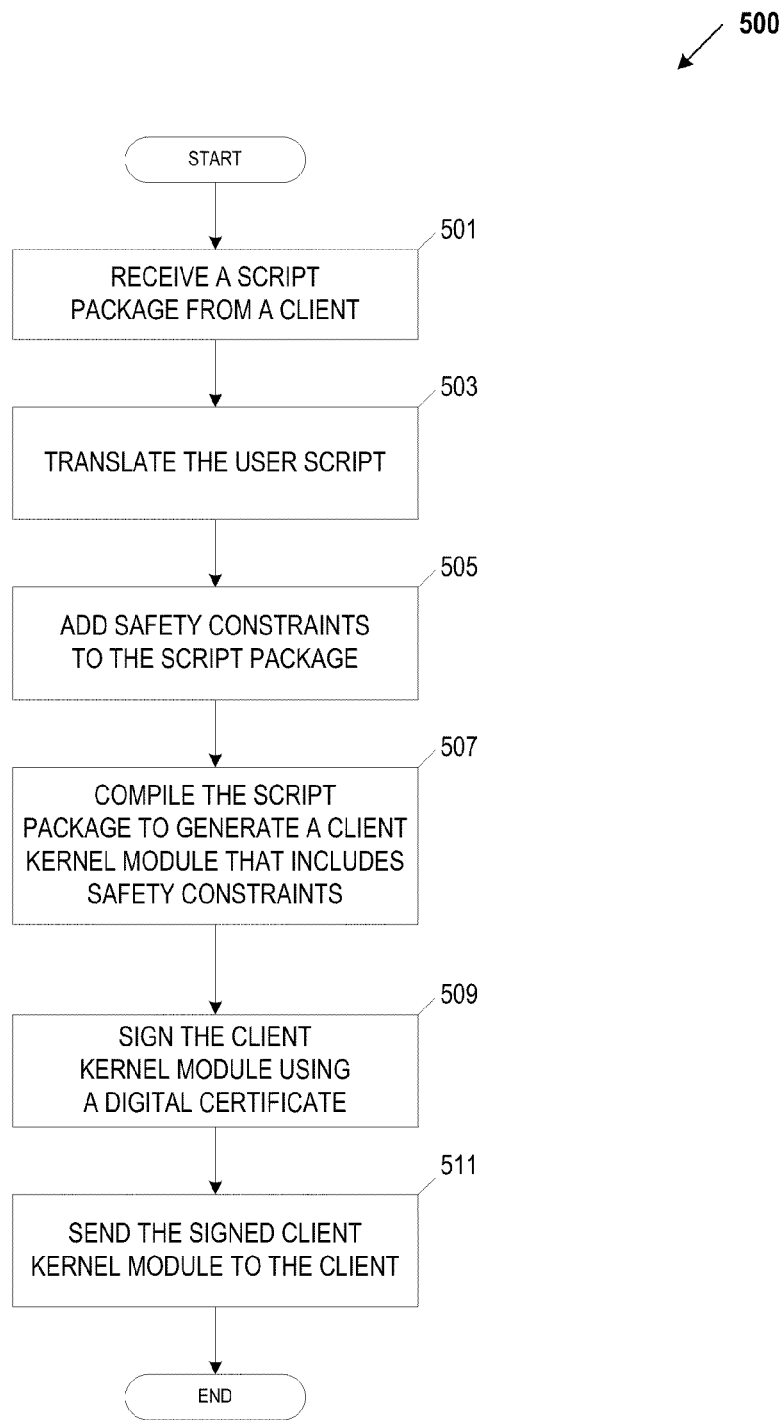
FIG. 5 is a flow diagram of one embodiment of a method for building a safe client kernel module in a trusted compilation environment.

The translator 310 can receive a script package from a client. A correctly packaged script contains a user introspection script (user script) and additional information for compiling the user script. The user script may be written in an introspection tool computing language, which the translator 310 can translate into, for example, C computing language. The translator 310 can also add safety constraints to the user script for generating a client kernel module that can limit the introspection functionality for an unprivileged user to a safe subset of introspection functions. The translator 310 can add code to a user script for additional safety constraints. FIG. 5 describes an embodiment of adding safety constraints to a user script in greater detail below.

The compiler 315 can compile the translated script, which includes the code for additional safety constraints, to create a stand-alone client kernel module to be loaded on a client. The signature manager 320 can attach a cryptographic signature to the client kernel module. The signature is based upon a digital certificate that is created by an owner (e.g., a system administrator) of a trusted compilation server. The module building system 300 can be coupled to a data store 340 that stores certificate data 345. The certificate data 345 can include a digital certificate for the trusted compilation server that hosts the module building system 300 and a private key for the trusted compilation server to create a digital signature. The signature manager 320 can cryptographically sign the client kernel module using the private key in the certificate data 345.

The module transmitter 325 can send the signed client kernel module to a client. A client can receive the signed client kernel module and can use a public key to verify whether the client kernel module was actually built and signed by a particular compilation server. A client can allow an unprivileged user to load and run a client kernel module that has a valid signature from a trusted compilation server.

The module building system 300 can be implemented as hardware, computer-implemented software, firmware or a combination thereof. In one embodiment, the module building system 300 comprises instructions stored in memory 604 that cause a processing device 602 in FIG. 6 described in greater detail below to perform the functions of the module building system 300.

Figure 4:
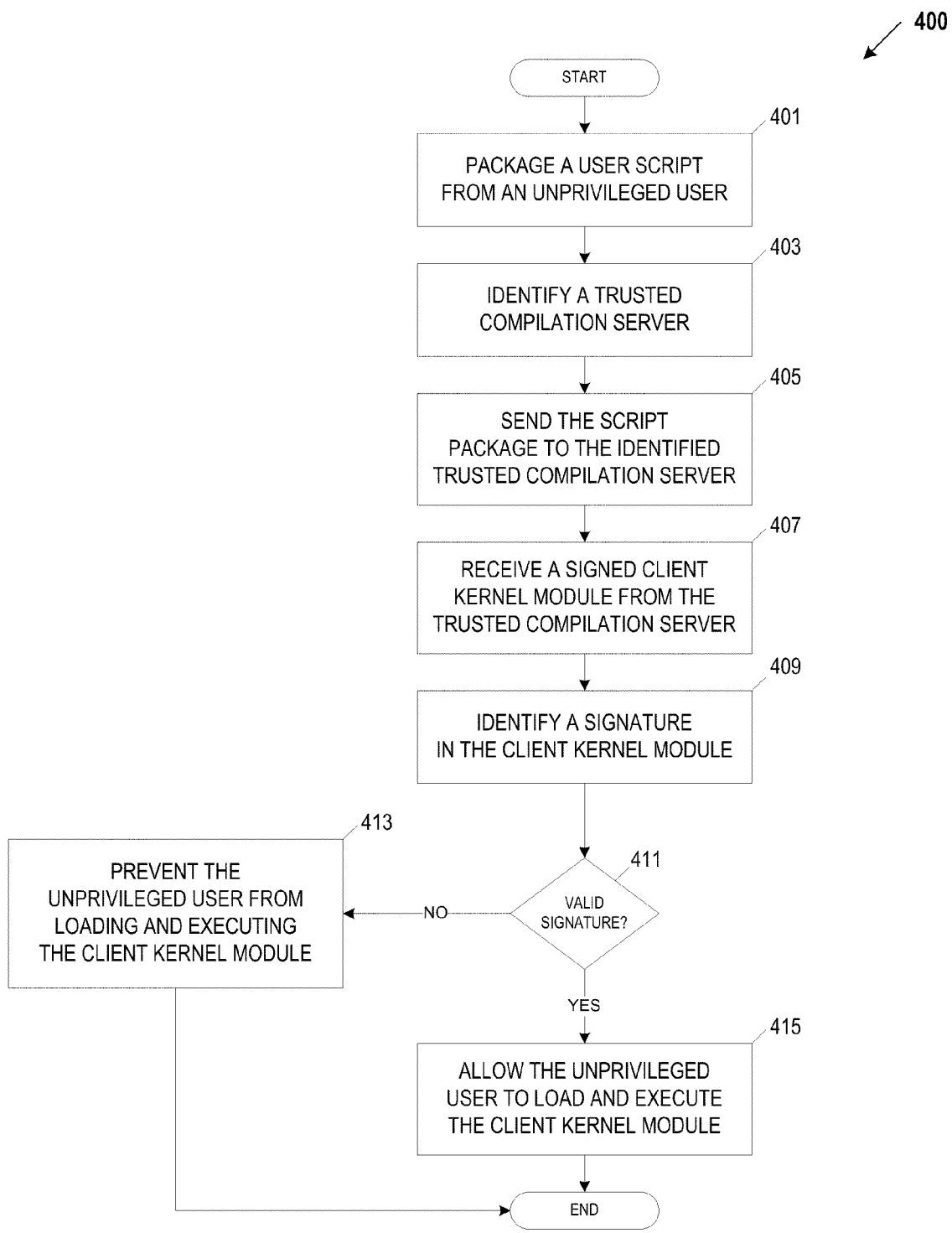
FIG. 4 is a flow diagram of one embodiment of a method for enabling an unprivileged user to load and execute a client kernel module.

FIG. 4 is a flow diagram of one embodiment of a method 400 for enabling an unprivileged user to load and execute a client kernel module. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by the client module building system 140 in client 130 of FIG. 1.

In one embodiment, the method 400 starts with a client executing an introspection tool to monitor the execution of software. The introspection tool receives a user script, such as a user script from an unprivileged user. A user script may be an existing script selected by the unprivileged user from the scripts stored in a script store, or any script submitted by the unprivileged user.

At block 401, the client module system packages the user script for submission to a trusted compilation server. The client module system can receive user input via a user interface, such as a 'stap-client' command for executing the 'stap' program for the SystemTap introspection tool, to package the user script.

At block 403, the client module system identifies a trusted compilation server to send the packaged script to. The client module system can automatically detect a trusted compilation server to send the packaged script to or a user (e.g., an unprivileged user) can specify a compilation server to send the packaged script to. A trusted compilation server can advertise itself and its capabilities on the network. For example, a trusted compilation server can utilize a 'avahi' daemon to advertise which version of the operating system it can create modules for, for which hardware architecture, etc. The client module system can select a trusted compilation server whose capabilities match the operating environment of the client host. If more than one trusted compilation server is advertised, a client can attempt to connect to each one in turn in an unspecified order until successful. The use of a trusted compilation server to translate and compile the user script, rather than having the client translate and compile the user script, provides a system administrator a means to formally approve certain selected trustworthy installations which are allowed to generate kernel modules and allowed to sign the kernel modules. By isolating the translation and compilation processes to a server that is trusted by a system administrator, a system administrator does not have to automatically trust an arbitrary server that an unknown entity is running on a network. In addition, the use of a trusted compilation server, rather than the client, for translating and compiling the user script places the trust of a system administrator in the compilation environment instead of the executable file (e.g., kernel module) itself. The trusted compilation server can be a server that is maintained by a system administrator. At block 405, the client module system sends the script package to the identified trusted compilation server.

At block 407, after the trusted compilation server generates and signs a client kernel module, the client module system receives the signed client kernel module from the trusted compilation server. At block 409, the client module system identifies a signature in the client kernel module. In one embodiment, the client module system can detect that the client kernel module does not include a signature (block 409) and can reject the client kernel module. The client module system can notify a user that the client kernel module is rejected for not having a signature.

At block 411, the client module system compares the signature against a database of approved digital certificates. The client module system may be coupled to a data store, such as a database, that stores digital certificates of trusted compilation servers which the client trusts and a public key for each certificate. An approved digital certificate can be a certificate for a compilation server that a system administrator may have designated as a trusted compilation server. A digital certificate has a corresponding public key. The client module system searches the data store for a certificate that corresponds to the signature in the client kernel module.

If there is not a certificate in the database that corresponds to the signature in the client kernel module (block 411), the client module system determines that the client kernel module is not signed by a trusted compilation server, and thus not valid at block 411, and the method continues to block 413. If there is a certificate in the database that corresponds to the signature in the client kernel module (block 411), the client module system can use the public key that is associated with the certificate to verify that the client kernel module was signed by a trusted compilation server. If the client module system determines from using the public key that the signature is not valid (block 411), the method continues to block 413.

At block 413, the client module system prevents an unprivileged user from loading and executing the client kernel module. A signature in the client kernel module that does not correspond to any of the approved certificates stored in the database or a signature that cannot be verified by a public key stored in the database can indicate that the client kernel module may have been tampered with. Unsigned kernel modules and kernel modules that are not signed with a valid signature can only be loaded by privileged users. The client module system can notify an unprivileged user that the client kernel module is rejected for not being signed using an approved certificate at block 413.

If the client module system determines from using the public key that the signature is valid (block 411), the client module system allows an unprivileged user to load and execute the client kernel module on the client at block 415. A kernel module that has a signature that is verified by a public key indicates that the kernel module is safe to be loaded and executed by an unprivileged user.

FIG. 5 is a flow diagram of one embodiment of a method 500 for building a safe client kernel module in a trusted compilation environment. Method 500 can be performed by processing logic that can comprise hardware (e.g., circuitry, dedicated logic, programmable logic, microcode, etc.), software (e.g., instructions run on a processing device), or a combination thereof. In one embodiment, method 500 is performed by the module building system 150 in compilation server 115 of FIG. 1.

In one embodiment, the method 500 starts with an unprivileged user using a client to package a user script for submitting the script package to a trusted compilation server. The script package can contain a user introspection script pertaining to the monitoring of software on a client. At block 501, the module building system hosted by a trusted compilation server receives the script package from the client.

At block 503, the module building system translates the user script. The user script may be written in an introspection tool computing language, which the module building system can translate into, for example, C computing language. At block 505, the module building system adds safety constraints to the user script for generating a client kernel module that can limit the introspection functionality for an unprivileged user to a safe subset of introspection functions. Full system-wide introspection instrumentation may be unsuitable for ordinary unprivileged users. The module building system can expand subroutines in a user script to a block of C computing code that includes locking checks and safety checks to limit an unprivileged user to a safe subset of introspection tool functionality. For example, the module building system can generate code into the module to query for the identity of the invoking user and add code to the module to limit probing functionality to the processes associated with a user identifier (user id) for the user and to block probing functionality for probing a kernel.

The additional safety constraints can be specified, for example, by a configuration file, command line arguments, or other methods, to control the behavior of the trusted compilation server with respect to different levels of safety constraints. For example, an option, provided by a client, in the script package can control whether a trusted compilation server compiles the script for an unprivileged user or for a privileged user.

At block 507, the module building system compiles the translated script, which includes the code for the additional safety constraints, to create a stand-alone client kernel module to be loaded on a client. The client kernel module is a introspection module that includes all of the safety checks and constraints to limit an unprivileged user's access to the functionality of the introspection tool to a safe subset of introspection tool functions.

At block 509, the module building system signs the client kernel module using a digital certificate. The module building system can attach a cryptographic signature to the client kernel module. The module building system can access certificate data that is stored in a data store. The certificate data can include a digital certificate for the compilation server that is signing the client kernel module and a private key for the compilation server to create a digital signature. The module building system can cryptographically sign the client kernel module using the private key.

At block 511, the module building system sends the signed client kernel module to the client. A client can receive the signed client kernel module and can use a public key to verify whether the client kernel module was actually built and signed by that particular compilation server. The client can allow an unprivileged user to load and execute the client kernel module if the signature is valid.

Figure 6:
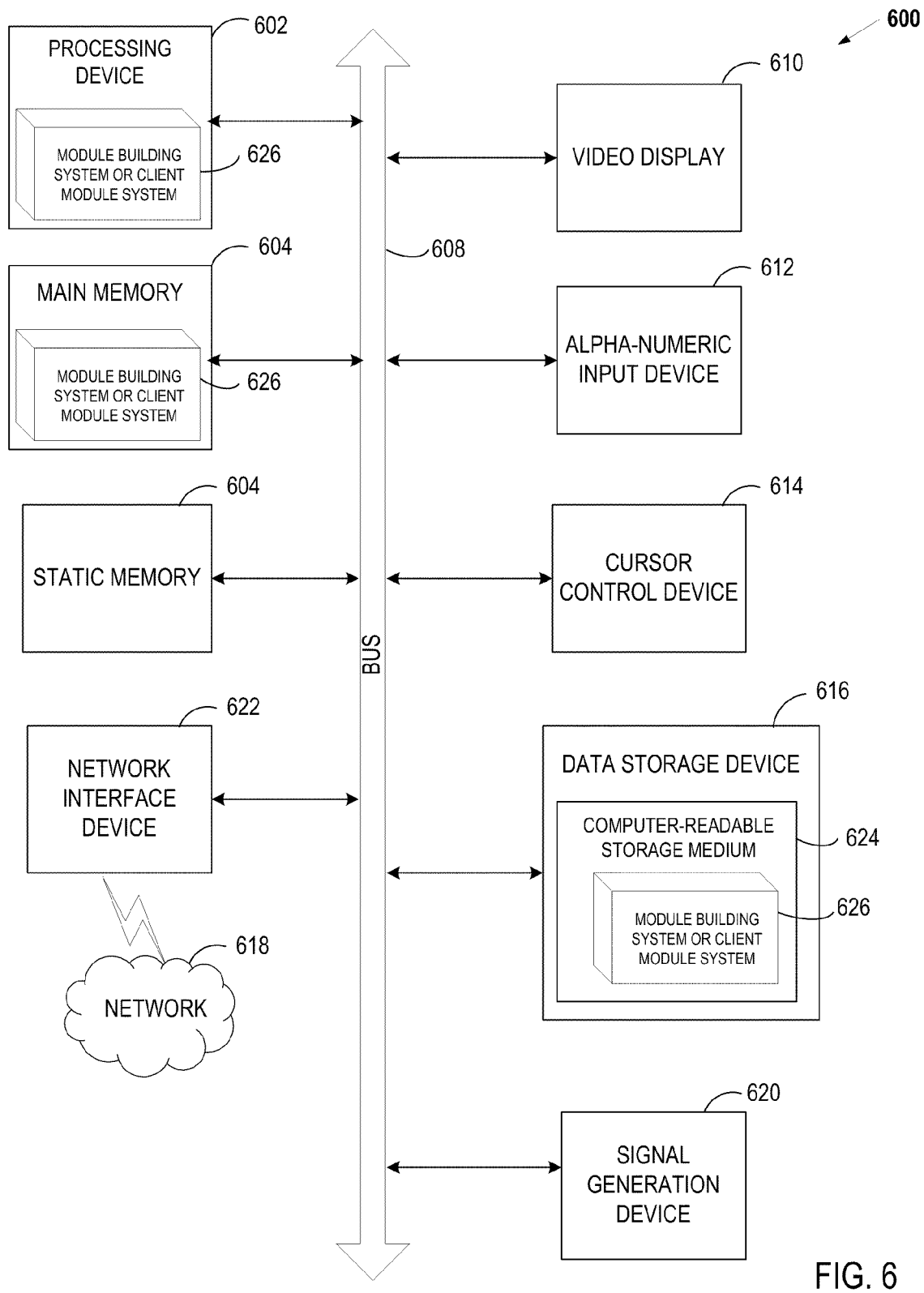
FIG. 6 is a diagram of one embodiment of a computer system for a client module system or a module building system.

FIG. 6 is a diagram of one embodiment of a computer system for generating a safe client kernel module using a trusted compilation server. Within the computer system 600 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, registers 628, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a secondary memory 616 (e.g., a data storage device in the form of a drive unit, which may include fixed or removable computer-readable storage medium), which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 can contain several kinds of registers, such as address registers 628. Address registers 628 can hold addresses that may be instructions that indirectly access memory. Processing device 602 is configured to execute the module building system or the client module system 626 for performing the operations and steps discussed herein.

The computer system 600 may further include a network interface device 622. The computer system 600 also may include a video display unit 610 (e.g., a liquid crystal display (LCD) or a cathode ray tube (CRT)) connected to the computer system through a graphics port and graphics chipset, an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions (e.g., the module building system or the client module system 626) embodying any one or more of the methodologies or functions described herein. The module building system or the client module system 626 may also reside, completely or at least partially, within the main memory 604 and/or within the processing device 602 during execution thereof by the computer system 600, the main memory 604 and the processing device 602 also constituting machine-readable storage media. The module building system or the client module system 626 may further be transmitted or received over a network 618 via the network interface device 622.

The computer-readable storage medium 624 may also be used to store the module building system or the client module system 626 persistently. While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The module building system or the client module system 626, components and other features described herein (for example in relation to FIG. 1) can be implemented as discrete hardware components or integrated in the functionality of hardware components such as ASICS, FPGAs, DSPs or similar devices. In addition, the module building system or the client module system 626 can be implemented as firmware or functional circuitry within hardware devices. Further, the module building system or the client module system 626 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "adding," "generating," "signing," "sending," "expanding," "storing, "using," "determining," "preventing," "allowing," "identifying," "notifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for generating a safe client kernel module using a trusted compilation server has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:
   receiving, by a server computing system, a user script from a client computing system, wherein the user script monitors software on the client computing system using an introspection tool on the client computing system;
   adding, by the server computing system, safety constraints to the user script;
   generating, by the server computing system, a client kernel module using the user script that comprises the safety constraints;
   signing, by the server computing system, the client kernel module; and
   sending, by the server computing system, the signed client kernel module to the client computing system, wherein the signed client kernel module limits functionality of the introspection tool probing a kernel on the client computing system.

2. The method of claim 1, wherein receiving the user script comprises receiving the user script from an unprivileged user of the introspection tool.

3. The method of claim 1, wherein adding safety constraints to the user script comprises:
   expanding a subroutine in the user script to include code for locking checks and safety checks that limit a user to a safe subset of introspection tool kernel probing functionality.

4. The method of claim 1 further comprising:
   storing a digital certificate and a private key that corresponds to the digital certificate.

5. A method comprising:
   sending, by a client computing system, a user script to a server over a network, the user script pertaining to monitoring of software on the client computing system using an introspection tool;
   receiving, by the client computing system, a client kernel module from the server, the client kernel module comprising a signature and safety constraints limiting functionality of the introspection tool probing a kernel;
   determining, by the client computing system, whether the signature is valid; and
   preventing, by the client computing system, a user from loading the client kernel module in view of a determination that the signature is not valid, and allowing the user to use the introspection tool to load the client kernel module in view of a determination that the signature is valid.

6. The method of claim 5, further comprising:
   storing a plurality of digital certificates, wherein an individual digital certificate in the plurality of digital certificates has a corresponding signature and public key.

7. The method of claim 6, wherein determining whether the signature is valid comprises:
   identifying the signature in the client kernel module;
   searching the plurality of digital certificates for a digital certificate that corresponds to the signature in the client kernel module; and
   determining that the signature is not valid in view of a determination that there is not a digital certificate in the plurality of digital certificates that corresponds to the signature in the client kernel module, and identifying the public key in view of a determination that there is a digital certificate in the plurality of digital certificates that corresponds to the signature in the client kernel module and using the public key to verify the signature.

8. The method of claim 5, wherein preventing the user from loading the client kernel module comprises:
   notifying the user that the client kernel module is rejected for not having a valid signature.

9. The method of claim 5, wherein the server is designated by a system administrator as being a trusted compilation server.

10. A system comprising:
    a memory to store a digital certificate and a private key that corresponds to the digital certificate; and
    a processing device coupled to the memory to receive a user script to monitor software on a client computing system using an introspection tool, add safety constraints to the user script,
    generate a client kernel module using the user script that comprises the safety constraints,
    sign the client kernel module using the private key, and
    send the signed client kernel module to the client computing system, wherein the signed client kernel module allows limits functionality of the introspection tool probing a kernel on the client computing system.

11. The system of claim 10, wherein to receive the user script comprises the processing device to receive the user script from an unprivileged user of the introspection tool.

12. The system of claim 10, wherein to add safety constraints to the user script comprises the processing device to expand a subroutine in the user script to include code for locking checks and safety checks that limit a user to a safe subset of introspection tool kernel probing functionality.

13. A system comprising:
    a memory to store a user script that pertains to monitoring of software on a client computing system using an introspection tool; and
    a processing device coupled to the memory to send the user script to a server over a network,
    receive a client kernel module from the server, the client kernel module comprising a signature and safety constraints limiting functionality of the introspection tool probing a kernel,
    determine whether the signature is valid, and
    prevent a user from loading the client kernel module in view of a determination that the signature is not valid and to allow the user to use the introspection tool to load the client kernel module a in view of determination that the signature is valid.

14. The system of claim 13, wherein to determine whether the signature is valid comprises the processing device to:
    identify the signature in the client kernel module;
    search the plurality of digital certificates for a digital certificate that corresponds to the signature in the client kernel module; and
    determine that the signature is not valid in view of a determination that there is not a digital certificate in the plurality of digital certificates that corresponds to the signature in the client kernel module, and identify the public key in view of a determination that there is a digital certificate in the plurality of digital certificates that corresponds to the signature in the client kernel module, and use the public key to verify the signature.

15. The system of claim 13, wherein to prevent the user from loading the client kernel module comprises the processing device to:
notify the user that the client kernel module is rejected for not having a valid signature.

16. The system of claim 13, wherein the server is designated by a system administrator as being a trusted compilation server.

17. A non-transitory computer-readable storage medium including instructions that, when executed by a processing device, cause the processing device to perform a set of operations comprising:
receiving a user script pertaining to monitoring of software on a client computing system;
adding safety constraints to the user script;
generating a client kernel module using the user script that comprises the safety constraints;
signing the client kernel module; and
sending, by the processing device, the signed client kernel module to the client computing system, wherein the signed client kernel module limits functionality of the introspection tool probing a kernel on the client computing system.

18. The non-transitory computer-readable storage medium of claim 17, wherein adding safety constraints to the user script comprises:
expanding a subroutine in the user script to include code for locking checks and safety checks that limit a user to a safe subset of introspection tool kernel probing functionality.

19. A non-transitory computer-readable storage medium including instructions that, when executed by a processing device, cause the processing device to perform a set of operations comprising:
sending a user script to a server over a network, the user script pertaining to monitoring of software on a client computer system using an introspection tool;
receiving a client kernel module from the server, the client kernel module comprising a signature and safety constraints limiting functionality of the introspection tool probing a kernel;
determining whether the signature is valid; and
preventing a user from loading the client kernel module in view of a determination that the signature is not valid, and allowing the user to load the client kernel module in view of a determination that the signature is valid.

20. The non-transitory computer-readable storage medium of claim 19, wherein the server is designated by a system administrator as being a trusted compilation server.

* * * * *